Aug. 10, 1943.  E. L. MAYO  2,326,242
AUTOMOTIVE VEHICLE HEATING APPARATUS
Filed Jan. 11, 1937  2 Sheets-Sheet 1
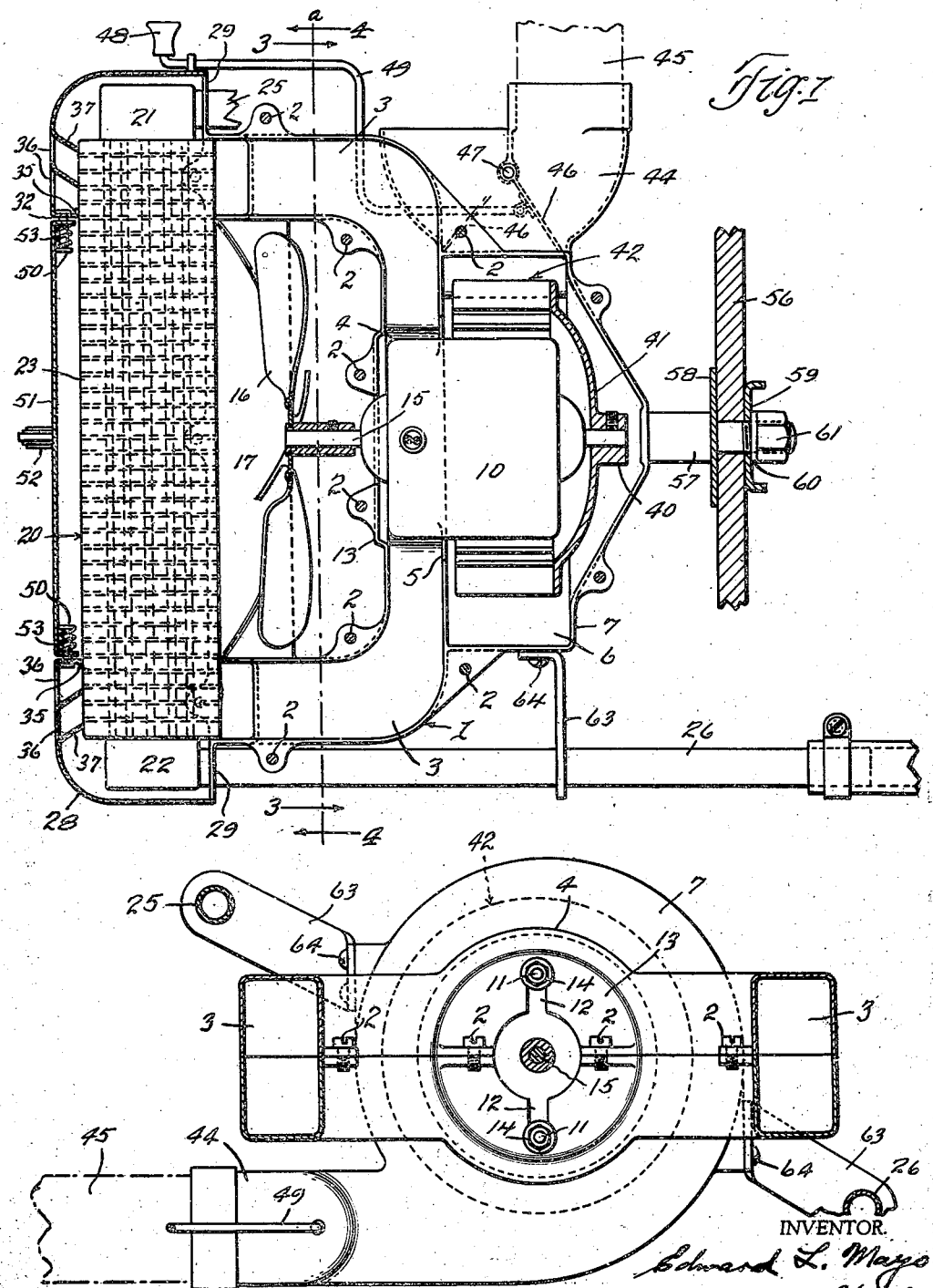
INVENTOR.
Edward L. Mayo
BY Hall, Brock & West
ATTORNEY.

Aug. 10, 1943.  E. L. MAYO  2,326,242
AUTOMOTIVE VEHICLE HEATING APPARATUS
Filed Jan. 11, 1937   2 Sheets-Sheet 2
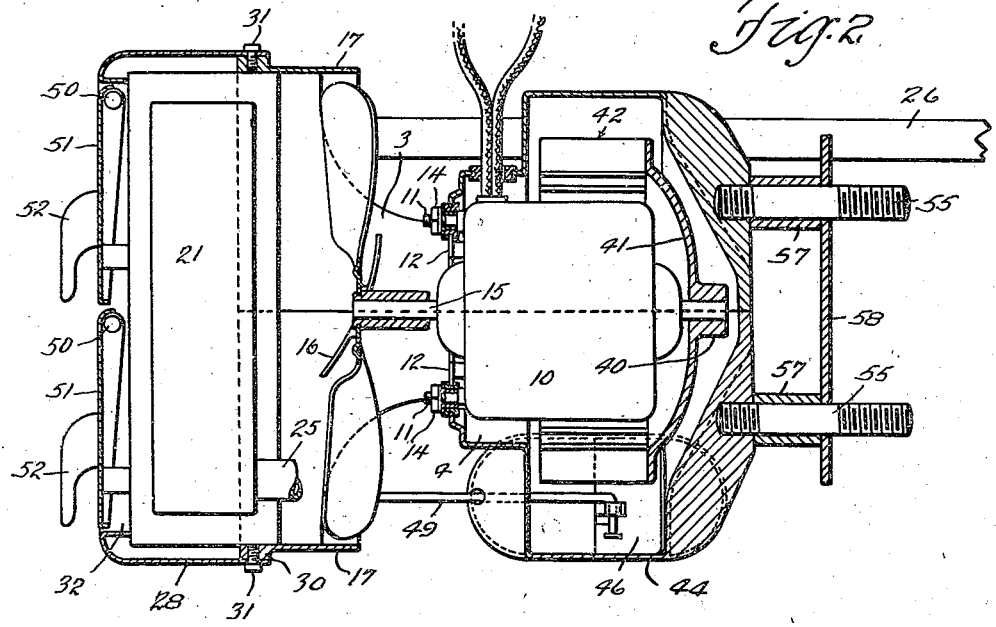

Patented Aug. 10, 1943

2,326,242

UNITED STATES PATENT OFFICE 2,326,242

AUTOMOTIVE VEHICLE HEATING APPARATUS

Edward L. Mayo, Cleveland, Ohio, assignor to The Bishop & Babcock Manufacturing Company, Cleveland, Ohio, a corporation of Ohio Application January 11, 1937, Serial No. 119,897

4 Claims. (Cl. 257—137)

This invention relates to forced draft heaters for automotive vehicles, and particularly to the class in which the air is heated by passing it through a fluid heated radiator.

The main objects of the invention are to attain simplicity of construction, sturdiness, compactness, symmetry and attractiveness of design, economy of manufacture, and high efficiency in a forced draft vehicle heater of the class referred to and which incorporates means for directing the heated air to a plurality of points in the vehicle where it may be applied to various uses, as, concurrently or alternatively, to the passenger compartment for heating it, and to the windshield of the vehicle for defrosting it or keeping it clear of condensation.

Other objects and advantages will appear as I proceed to describe the invention by reference to the accompanying drawings wherein Fig. 1 is a central horizontal section, and Fig. 2 a central vertical section, through the heater; Fig. 3 is a sectional view taken on the line 3—3 of Fig. 1, looking in the direction of the arrows 3—3, and Fig. 4 is a sectional view on the same line, looking in the direction of the arrows 4—4.

Describing the invention by the use of reference characters, I designates generally a two-part housing that consists of similar top and bottom sections connected together by fastening means 2, shown as screws. In the present embodiment, the sections of the housing are die-castings formed in such manner as to provide laterally spaced passageways 3 that flare in a vertical direction at their forward open ends and merge at their rear ends in a circular enlargement 4 that communicates, through an opening 5, with a fan chamber 6 enclosed by a snail shell part 7 of the housing.

Supported centrally within the opening 5, and occupying the enlargement 4 and fan chamber 6, is a motor 10, the same being supported by studs 11 that extend from the front end thereof through slots 12 in a wall 13 of the housing, nuts 14 being shown as applied to the studs for clamping the motor firmly to said wall.

Secured to the front end of the motor shaft 15 is a fan 16, and surrounding the fan, and constituting a protective casing therefor, are the side portions of the housing 1 that contain the passageways 3, and webs 17 that connect said side portions at top and bottom.

Fitted within the open front of the housing, and bearing against the ends of the inner walls of the passageways 3, is a radiator unit designated generally by the numeral 20 and comprising headers 21 and 22 and a core 23 through which the headers communicate. The core 23 may be of the usual honeycomb or equivalent type and from the description thus far it will be seen that when the motor 10 is energized to drive the fan 16, air will be blown through the core of the radiator. Conduits 25 and 26 communicate with the respective headers 21 and 22 for circulating fluid through the radiator, it being usual to connect these conduits with the cooling system of the vehicle engine.

Enclosing the radiator 20 is a shell 28 whose rear lateral edges meet the outer edges of flanges 29 that extend from the sides of the housing 1 and whose top and bottom edges overlie relatively wide flanges 30 that extend transversely along the top and bottom of the casing and to which the shell is secured by suitable fastening means, such as screws 31. The front of the shell has an opening 32, the vertical dimension of which is slightly less than the height of the radiator core 23, while the width of said opening is considerably less than the length of said core so that the ends of the core extend a material distance beyond the sides of the opening. The opening is surrounded by an inwardly directed flange 35 that bears against the radiator core and holds it firmly within the front of the housing. Beyond each side of the opening 34, the front of the shell is provided with slots 36 and, in the present instance, the material that is struck from the shell to produce these slots is deflected rearwardly to provide louvers 37.

Fastened to the rear end of the motor shaft 15 is the hub 40 of a dished disk 41 that constitutes a part of a blower fan of the sirocco type, or so-called rotor, designated 42. This fan surrounds the rear end of the motor and operates within the previously mentioned chamber 6, the latter having a branched outlet 44. One branch of the outlet connects with a conduit 45, indicated in dot-and-dash line, which may lead to a point adjacent the windshield of the vehicle for delivering heated air thereto for the purpose of keeping it clear of frost or condensation. The other branch of the outlet opens to the surrounding atmosphere and when the heater is installed in the usual way directs heat to the position of the driver's feet. A shutter 46 is pivotally supported at 47 between the two branches of the outlet 44, and the same may be adjusted by means of an operating handle 48 to cause the blower to expel the air through either or both of the branches, said handle being connected, through a link 49, with the shutter, as clearly shown in Figs. 1 and 2.

It is evident from the description thus far that when the motor 10 is in operation, heated air will be expelled from the front of the heater into the passenger compartment, as previously explained, and additional air will be drawn in through the slots 36 of the shell 28, through the end portions of the radiator core and through the passageways 3 and opening 5 into the fan chamber 6 from which it is expelled through the outlet 44, either to the windshield for defrosting purposes, or to the feet of the driver, or to both locations, depending upon the position of the shutter 46.

Pivotally supported on pins 50 within the opening 32 of the shell 28 are heat deflectors, the same being in the nature of doors equipped with handles 52. Springs 53 that surround the pins 50 and are compressed between the heads of the pins and side flanges of the deflectors 51 produce sufficient friction on said parts to hold the deflectors against vibration and in various positions of adjustment. The deflectors may be adjusted to distribute the heated air expelled from the front of the heater as desired.

Studs 55 extend from the rear of the housing and provide means for attaching the heater to a part 56 of the vehicle as, for example, the partition that separates the passenger compartment from the engine compartment. According to the present installation, sleeves 57 and an apertured plate 58 are engaged over the studs ahead of the partition, and on the opposite side thereof a channel member 59, washers 60 and nuts 61 are applied to the studs. Adjacent the rear end of the heater the conduits 25 and 26 are supported by brackets 63 that are fastened, as by screws 64, to the housing 1.

Having thus described my invention, what I claim is:

1. In a heater for automotive vehicles, a radiator core, a supporting housing extending rearward from said core providing spaced apart arms defining air inlet passages, said core being mounted on the forward ends of said arms with its outer portions overlying the forward ends of said passages, a fan of the radial delivery type for drawing air through said outer portions of said core and through said passages, a housing for said fan secured to said arms, means for directly mounting said fan housing on a part of the vehicle, a fan of the axial delivery type disposed adjacent the rear of said core between and guarded by said arms for forcing air through the inner portion of said core between said arms, and a single motor operating both fans.

2. In a heater for automotive vehicles, a radiator core, a substantially U-shaped supporting housing extending rearward from said core provided with a fan chamber having an outlet opening, means for directly mounting said fan chamber on a part of the vehicle, said housing defining two air inlet passages open at the forward ends of the arms thereof and opening into said fan chamber, said core being mounted on said housing with its end portions overlying the forward ends of said passages and its area between said arms unobstructed for flow of air therethrough, a motor, a fan in said chamber driven by said motor for drawing air through said end portions of said core and said passages into said chamber and expelling it therefrom through said outlet opening, and a second fan in rear of said core disposed between and guarded by said arms and driven by said motor for forcing air through the area of said core between said arms.

3. In a heater for automotive vehicles, a radiator core, a substantially U-shaped supporting housing extending rearward from said core provided at its bight portion with a chamber structure comprising a forward inlet chamber and a rearward fan chamber opening into said forward chamber and provided with a tangential outlet opening, means for directly mounting said rearward fan chamber on a part of the vehicle, said housing defining two air inlet passages open at the forward ends of the arms thereof and opening at their rearward ends into said forward chamber, said core being mounted on the forward ends of said arms with its end portions overlying the forward ends of said passages and its area between said arms unobstructed for flow of air therethrough, a motor, a centrifugal type fan in said fan chamber driven by said motor for drawing air through said end portions of said core and said passages into said fan chamber and expelling it therefrom through said outlet opening, and a second fan of the propeller type in rear of said core disposed between and guarded by said arms and driven by said motor for forcing air through the area of said core between said arms.

4. In a heater for automotive vehicles, a radiator core, a substantially U-shaped supporting housing extending rearward from said core provided at its bight portion with a central chamber structure comprising a forward inlet chamber and a rearward fan chamber opening into said forward chamber and provided with a tangential outlet opening, means for directly mounting said rearward fan chamber on a part of the vehicle, said housing defining two substantially L-shaped air inlet passages open at the forward ends of the arms of said housing and opening at their rearward ends into said inlet chamber, said core being mounted on the forward ends of said arms with its end portions overlying the forward ends of said passages and its area between said arms unobstructed for flow of air therethrough, a motor mounted on the forward wall of said inlet chamber extending therefrom into said fan chamber, a centrifugal type fan extending about the rearward portion of said motor secured on the shaft thereof within said fan chamber for drawing air through said end portions of said core and said passages into said fan chamber and expelling it therefrom through said outlet opening, and a propeller type fan secured on the shaft of said motor disposed between and guarded by said arms adjacent the rear of said core for forcing air through the area thereof between said arms.

EDWARD L. MAYO.